Patented June 19, 1945

2,378,494

UNITED STATES PATENT OFFICE 2,378,494

STABILIZED POLYAMIDE

Robert Wighton Moncrieff and Edward William Wheatley, Spondon, near Derby, England, assignors to Celanese Corporation of America, a corporation of Delaware No Drawing. Application February 12, 1941, Serial No. 378,610. In Great Britain April 2, 1940

12 Claims. (Cl. 260—78)

This invention relates to improvements in the production and/or treatment of polymeric organic compounds, especially of such compounds as have a sufficiently high molecular weight to form fibres or films.

A number of methods have been described by which polymeric compounds of fibre- or film-forming properties may be produced and these in general involve the union of the residues of the molecules of one or more reagents, each containing two reactive groups, by the condensation of a reactive group of one molecule with a reactive group of another molecule, water, hydrochloric acid or a similar simple substance being eliminated. For example, diamines may be condensed with dicarboxylic acids, with dihalogen derivatives of hydrocarbons, with disulphonic acids, or with glycols, amino-carboxylic acids or amino-sulphonic acids may be condensed with themselves or with each other, di-acid amides may be condensed with di-acids, and so forth. A suitable choice of reagents permits the production of long chain molecules of high molecular weight which can be converted by suitable methods into fibres or films. Preferably reagents are chosen which have no substantial tendency to condense to form cyclic compounds. This may be achieved by selecting the reagents in such a way that the "unit length" of the resulting polymer consists of more than six atoms in a chain and preferably more than seven atoms. In the case of condensing a diamine with a dicarboxylic acid, for example, the unit length is arrived at by adding the number of atoms joining the two nitrogen atoms in the diamine plus 2 to the number of atoms joining the carboxylic groups in the dicarboxylic acid plus 2.

The condensations, particularly those taking place with elimination of water, are preferably effected at fairly high temperatures, especially in the later stages, for example temperatures of the order of 200-300° C. The actual temperature employed will depend upon the particular reagents undergoing condensation, and in some cases much lower temperatures may be used. The resulting polymers may be formed into textile filaments, bristles, ribbons, films and the like, and in order to convert the polymers into such useful forms and in order to work them in a number of other ways, it is frequently convenient to operate at fairly high temperatures, again of the order of 200-300° C. Thus, for instance, filaments may be produced by spinning the molten polymer. In order to spin or work the polymer successfully, it is necessary that it should remain unchanged over considerable periods of time, i. e. many days or even weeks, at the spinning or other working temperatures, but, as has already been indicated, such temperatures are of the same order as the temperatures used for condensation, and hence there is a marked tendency of the polymers to undergo further polymerisation or decomposition and therefore change in properties, particularly viscosity, chemical nature, colour, etc., which affects the regularity of the spinning or other working operation and may even render spinning impossible.

It is the object of the present invention to treat the already formed polymers or to conduct the polymerisation in such a way that there is no substantial change in the character of the resuling polymer during the prolonged heating which is necessary in any commercial installation for spinning. According to the present invention, we achieve this result by treating the already formed polymer, or by adding to the raw materials before condensation, or by adding to the reaction mass during condensation, small quantities of boric acid, of a salt of boric acid, particularly with a metal which forms colourless compounds, e. g. sodium, calcium, strontium, magnesium or zinc borate, or of an ester of boric acid, e. g. triethyl borate. It is to be understood that where reference is made in the present specification and claims to "boric acid" we intend this term to include dehydration products of orthoboric acid as well as orthoboric acid itself; thus, for example, metaboric acid, boric anhydride, or a salt or ester of metaboric acid may be employed according to the invention.

The amount of boric acid or boric acid salt or ester which is to be added in accordance with the present invention depends upon the viscosity desired, in the ultimate polymer. Where low viscosity products are required, for example products suitable for use in lacquers or similar coating compositions, there may be used proportions of boric acid or boric acid salt or ester of the order of 5% or more molecular concentration in relation to the amount of reagents undergoing polymerisation or to the amount of reagents equivalent to the polymer treated. In most cases where polymers of sufficiently high viscosity to be film- or fibre-forming are required, lower molecular concentrations may be employed, e. g. molecular concentrations of the order of 0.1 to 1.0 or 2.0% or even more. In all cases a simple experiment will serve to determine the amount of boric acid or boric acid salt or ester necessary to secure a given viscosity. The viscosity in the case of fibre-forming polymers may be such as corresponds to a molecular weight of the order of 4000 or more, and particularly 6000-10,000.

As already indicated, the already formed polymer may be treated with the boric acid or boric acid salt or ester and in this case a comparatively short heating serves to bring about the desired reaction, or the stabilising agent may be added to the original reagents before any condensation takes place, or may be added at any suitable stage during the condensation. In the case of adding the boric acid or boric acid salt or ester before or during the condensation, the condensation conditions themselves generally serve to bring about the desired reaction. The condensation is preferably carried out in the presence of a solvent for the raw materials and for the polymer itself. Similarly it is desirable that the boric acid or boric acid salt or ester should itself be soluble in the solvent employed, irrespective of the stage in the condensation at which it is added. As solvents, phenolic compounds, for example phenol, the cresols, xylenols, oxy-di-phenyls and the like, are generally suitable.

While the present invention may be applied to the stabilisation of condensation products of all kinds, it is of the greatest advantage when applied to the stabilisation of polymers produced from reagents of which at least one reactive group contains basic nitrogen or is a hydroxyl group.

Besides boric acid, other inorganic acids of similar strength, or their equivalents, may be employed according to the invention. For example, arsenic trioxide, or metal or alkyl arsenites may be employed.

The following example illustrates the invention:

A mixture of 100 parts by weight of the salt formed from equimolecular proportions of hexamethylene-diamine and adipic acid, 106 parts of redistilled xylenol and 0.46 parts of boric acid is heated under reflux while an atmosphere of nitrogen is maintained in the heating chamber. After heating for four hours at 220° C. the reaction mass is poured into a precipitating medium, e. g. ethyl alcohol or acetone, and the polymer purified as necessary for subsequent use.

It is to be understood that the term "boric acid" as used in the description and claims is intended to include only simple acids containing only boron and oxygen in the acid radicle, and to exclude mixed acids which contain in addition atoms of other elements in the acid radicle.

Having described our invention, what we desire to secure by Letters Patent is:

1. In a process for the production of fibre-forming condensation polymers suitable for shaping by melt spinning, the step which comprises producing a stable polyamide by heating mixtures of diamines and dibasic acids with a compound selected from the group consisting of a simple boric acid containing only boron and oxygen in the acid radicle, a salt and an ester thereof.

2. In a process for the production of fibre-forming condensation polymers suitable for shaping by melt spinning, the step which comprises producing a stable polyamide by heating mixtures of diamines and dibasic acids with ortho-boric acid.

3. In a process for the production of fibre-forming condensation polymers suitable for shaping by melt spinning, the step which comprises producing a stable polyamide by heating mixtures of diamines and dibasic acids with zinc borate.

4. In a process for the production of fibre-forming condensation polymers suitable for shaping by melt spinning, the step which comprises producing a stable polyamide by heating mixtures of diamines and dibasic acids with a compound selected from the group consisting of a simple boric acid containing only boron and oxygen in the acid radicle, a salt and an ester thereof, in an amount ranging from 0.1 to 5.0 molar per cent of the amide groups present in the polyamide.

5. In a process for the production of fibre-forming condensation polymers suitable for shaping by melt spinning, the step which comprises producing a stable polyamide by heating mixtures of diamines and dibasic acids with ortho-boric acid, in an amount ranging from 0.1 to 5.0 molar per cent of the amide groups present in the polyamide.

6. In a process for the production of fibre-forming condensation polymers suitable for shaping by melt spinning, the step which comprises producing a stable polyamide by heating mixtures of diamines and dibasic acids with zinc borate, in an amount ranging from 0.1 to 5.0 molar per cent of the amide groups present in the polyamide.

7. A fibre-forming condensation polyamide which on hydrolysis yields a mixture of diamines and dibasic acids, said polyamide being homogeneously stabilized by heat-reaction with a compound selected from the group consisting of a simple boric acid containing only boron and oxygen in the acid radicle, a salt and an ester thereof.

8. A fibre-forming condensation polyamide which on hydrolysis yields a mixture of diamines and dibasic acids, said polyamide being homogeneously stabilized by heat-reaction with ortho-boric acid.

9. A fibre-forming condensation polyamide which on hydrolysis yields a mixture of diamines and dibasic acids, said polyamide being homogeneously stabilized by heat-reaction with zinc borate.

10. A fibre-forming condensation polyamide which on hydrolysis yields a mixture of diamines and dibasic acids, said polyamide being homogeneously stabilized by heat-reaction with an amount of a compound selected from the group consisting of a simple boric acid, a salt and an ester thereof, corresponding to from 0.1 to 5.0 molar per cent of the amide groups present in the polyamide.

11. A fibre-forming condensation polyamide which on hydrolysis yields a mixture of diamines and dibasic acids, said polyamide being homogeneously stabilized by heat-reaction with an amount of ortho-boric acid corresponding to from 0.1 to 5.0 molar per cent of the amide groups present in the polyamide.

12. A fibre-forming condensation polyamide which on hydrolysis yields a mixture of diamines and dibasic acids, said polyamide being homogeneously stabilized by heat-reaction with an amount of zinc borate corresponding to from 0.1 to 5.0 molar per cent of the amide groups present in the polyamide.

ROBERT WIGHTON MONCRIEFF.
EDWARD WILLIAM WHEATLEY.